United States Patent [19]

Higson

[11] Patent Number: 4,736,551
[45] Date of Patent: Apr. 12, 1988

[54] STRUCTURAL UNIT FOR FORMING A BUILDING

[76] Inventor: Martin T. Higson, 116 Russell Road, Forest Fields, Nottingham, NG7 6GZ, England

[21] Appl. No.: 898,606

[22] Filed: Aug. 21, 1986

[30] Foreign Application Priority Data

Sep. 26, 1985 [GB] United Kingdom ............... 8523741

[51] Int. Cl.⁴ .................... E04B 1/32; E04B 7/08; F16B 1/00
[52] U.S. Cl. .................................. 52/81; 52/80; 52/648; 52/DIG. 10; 403/171; 403/176; 403/403
[58] Field of Search ............ 52/81, 80, 648, DIG. 10; 403/171, 172, 176, 403

[56] References Cited

U.S. PATENT DOCUMENTS

| | | | |
|---|---|---|---|
| 1,242,892 | 10/1917 | Wagner | 52/648 |
| 2,080,916 | 5/1937 | Hayden | 52/648 |
| 3,002,590 | 10/1961 | Hannoosh et al. | 52/81 |
| 3,043,054 | 7/1962 | Schmidt | 52/81 |
| 3,255,556 | 6/1966 | D'Amato et al. | 52/822 |
| 3,785,101 | 1/1974 | Ahern | 52/81 |
| 3,857,150 | 12/1974 | Faucheux | 52/81 |
| 3,994,106 | 11/1976 | Grosser et al. | 52/81 |
| 4,009,543 | 3/1977 | Smrt | 52/582 |
| 4,026,078 | 5/1977 | Ahern et al. | 52/81 |
| 4,032,242 | 6/1977 | Morris | 403/403 |
| 4,072,433 | 2/1978 | Veyhl | 403/172 |
| 4,194,851 | 3/1980 | Littlefield | 52/80 |
| 4,580,922 | 4/1984 | Coppa | 52/648 |
| 4,603,519 | 8/1986 | Lew et al. | 52/648 |

FOREIGN PATENT DOCUMENTS

| | | |
|---|---|---|
| 3137202 | 5/1983 | Fed. Rep. of Germany . |
| 8502433 | 6/1985 | PCT Int'l Appl. . |
| 1109139 | 4/1968 | United Kingdom . |
| 1343597 | 1/1974 | United Kingdom ............ 52/81 |

Primary Examiner—Carl D. Friedman
Assistant Examiner—Michael Safavi

[57] ABSTRACT

A structural unit for forming a building, which structural unit comprises at least three elongate members which are connected to each other to define an area, a covering of a flexible material which is secured to the elongate members and which covers the area defined by the elongate members, and a locking device which connects at least one pair of the elongate members, the locking device being such that it operates with a wedging action whereby tightening of the locking device causes the two elongate members to move with respect to the locking device such that the two elongate members move apart to increase the surface area of the structural unit and thereby tighten the covering of the flexible material.

9 Claims, 8 Drawing Sheets

STRUCTURAL UNIT FOR FORMING A BUILDING

This invention relates to a structural unit for forming a building.

Permanent buildings are conventionally formed from bricks and timber whilst temporary buildings such for example as marquees are conventionally formed from canvass. Geodesic structures are known which can be used as permanent or temporary buildings. The geodesic structures, especially for use as permanent buildings have yet to receive widespread acceptance, although savings in construction times, material costs and building heating costs are recognised to achieveable.

It is an aim of the present invention to provide a structural unit which can be used for producing a permanent or temporary building of a type which is not made in a conventional manner from bricks and timber.

Accordingly, this invention provides a structural unit for forming a building, which structural unit comprises at least three elongate members which are connected to each other to define an area, a covering of a flexible material which is secured to the elongate members and which covers the area defined by the elongate members, and a locking device which connects at least two of the elongate members, the locking device comprising a wedge member and a tightening arrangement for tightening the wedge member in position, and the two elongate members being angularly oriented to define an angle with an apex therebetween, the tightening arrangement exerting a force on the wedge member directed towards the apex for moving the two connected elongate members apart to increase the surface area of the structural unit and thereby tighten the covering of the flexible material.

The structural unit will usually have only three of the elongate members, the structural unit then being the form of a triangle. If desired, the structural unit may have four of the elongate members, in which case the structural unit may then be in the form of a square or a rectangle. Triangular shaped structural units are preferred since the acute angles formed in the structural units lend themselves better to being locked with the wedging action of the locking device than the right angle joints of a square or a rectangular structural unit.

Usually, there will be one of the locking devices at each of the joints between the elongate members of the structural unit.

The locking device may comprise a wedge member, and a tightening arrangement for tightening the wedge member in position.

The wedge member may be formed in two or more parts which fit together. However, preferably, the wedge member is formed as a one piece member.

The elongate members may have upper and lower inwardly directed lips for engaging in and sliding along the wedge member.

The upper lip may slide in a recessed portion in the wedge member, and the lower lip may slide in a slit in the wedge member.

The tightening arrangement may comprise at least one bolt and at least one clamp member for abuting one end of a pair of the elongate members, the wedge member having an aperture for receiving the bolt.

Preferably, the tightening arrangement comprises two bolts and two clamp members, each said clamp member being for abuting one end of a pair of the elongate members, and the wedge member having a pair of apertures for receiving the pair of bolts.

The tightening arrangement may alternatively comprise a pair of bolts each having a hooked end for abuting one end of a pair of the elongate members.

The flexible material may be a plastics material.

The plastics material may be a transparent plastics material for use when the structural unit is to be used for forming a building such for example as a greenhouse or a summer house. The plastics material may be arranged to be opaque if the structural unit is to be formed for use in a building such for example as a sports hall. The plastics material may be polyvinyl chloride, a polyester material or nylon. Where the structural unit is to be used for forming a building such for example as a marquee or a tent, then the flexible material may be canvass. Generally, any type of flexible material may be employed appropriate to the type of building to be formed.

The covering may be secured to the elongate members in any appropriate manner. Usually, the covering will be secured over the outer surfaces of the elongate members, for example using double sided adhesive tape. The covering may be clamped in position using appropriate clamping arrangements.

In order to produce consistent structural units that will expand on tightening of the locking device to the same extent so that the structural units can be used with equal ease in producing the building, it will be apparent that exactly the right amount of covering should be employed for each structural unit. The structural units are thus best prepared using a jig. Where the covering is of a flexible plastics material, the covering may be secured in position employing vacuum techniques, or the covering may be held in position on the jig by adhesive tape. Obviously, with too much or too little flexible material, the structural unit will make up to an incorrect shape.

Depending upon the type of elongate members employed, a building produced with a plurality of the structural units may expand and contract with varying temperatures if the elongate members expand and contract. In order to allow for this expansion and contraction, the ground fixings for any structural units should desirably not be of a rigid nature. The locking device is advantageous in that it can be tightened over a range to give a range of wedging expansions which enable variations in the amount of the covering of the flexible material easily to be taken up. The precise size and configuration of the covering and the structural unit to be formed may be calculated prior to assembly.

If desired, the structural unit may be provided with two or more adjacent coverings of the flexible material in order to give a double heat insulation effect. If the coverings are assembled in close proximity to one another and appropriately sealed, they may be inflated to give an insulation effect.

The elongate members will usually be provided with a plurality of holes for enabling the structural units to be bolted together.

The elongate members may be provided with strengthening members. The strengthening members may act to transfer forces, set up when the structural units are bolted together, to the outside edges of the elongate members.

The strengthening members may be bolted to the elongate members.

As indicated above, the present invention also extends to a building when including a plurality of the structural units.

The building will usually be a geodesic structure but the building may be of another type of structure.

The building may comprise a plurality of nodes formed by joining the structural units together.

The nodes may be circular nodes, the end of the elongate members of the various structural units being such that they do not meet at the nodes.

Where the building has circular holes at the nodes, then the circular holes may be covered by a top cap. If desired, a bottom cap may also cover the circular holes.

The structures formed using the structural units may be such that the structural units have one or more skins of the coverings of the flexible material as indicated above. In addition, a structure may be formed by using the structural units to produce a building, insulating the inside of the building, and then placing another building on the inside. The said other building placed on the inside may be one formed from the structural units of the present invention or it may be one formed in a known manner. Similarly, if desired, the structural units can be used where a first building is formed, insulated on its outside and then a second building is formed over the insulated outside of the first building.

The buildings produced in accordance with the present invention may be associated with a space frame arrangement.

The space frame arrangement may comprise masts and/or wires for enabling a building formed of the structural units to be provided with an inner or an outer covering.

The structural units of the invention may be used for forming buildings such for example as greenhouses, summer houses, domestic houses, warehouses, sports halls, changing rooms, tents, marquees, light industrial units, factories, work spaces and agricultural buildings. The green houses may be for domestic use, for market gardeners, for schools or for hospitals.

Embodiments of the invention will now be described solely by way of example and with reference to the accompanying drawings in which.

Figure 1:
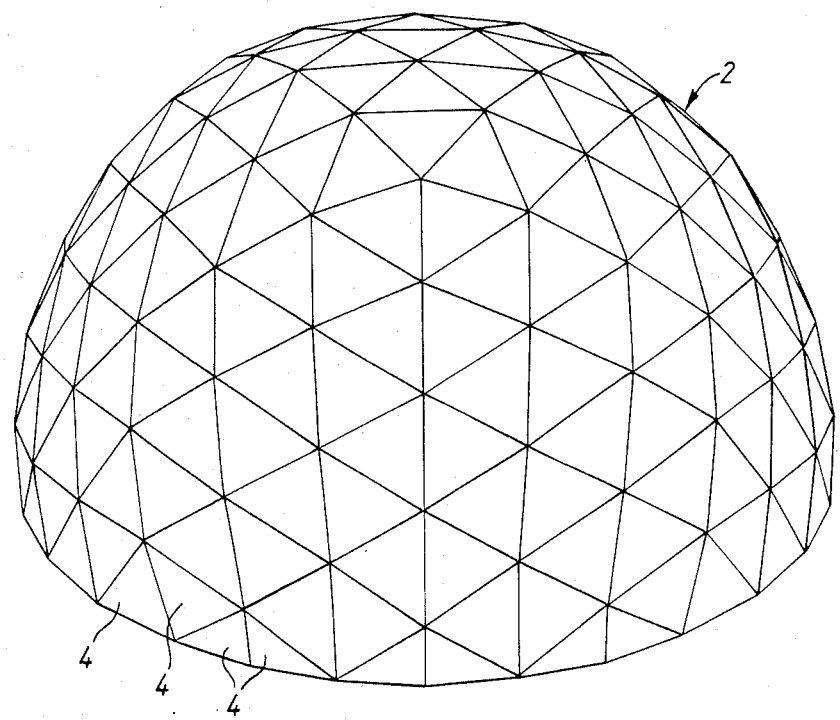
FIG. 1 shows a building in the form of a geodesic structure which may be produced using the structural units.

Referring to the drawings, there is shown in FIG. 1 a building 2 in the form of a geodesic structure which is made up of a plurality of triangular structural units 4. The structural units 4 are as described hereinbelow.

Figure 2:
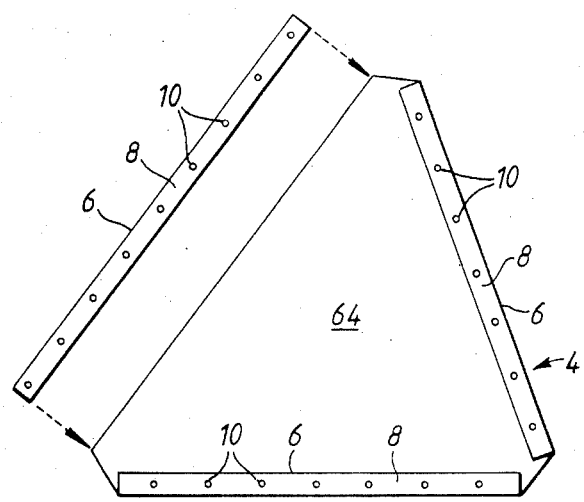
FIGS. 2 and 3 show how the structural units may be bolted together.
Figure 3:
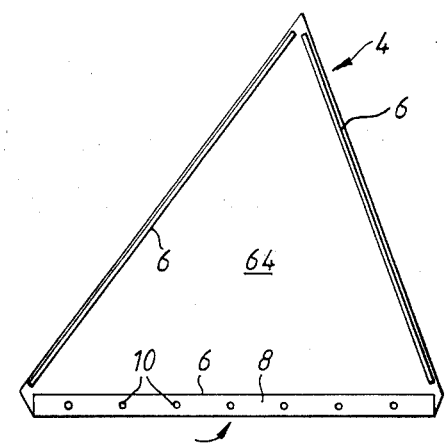
Figure 4:
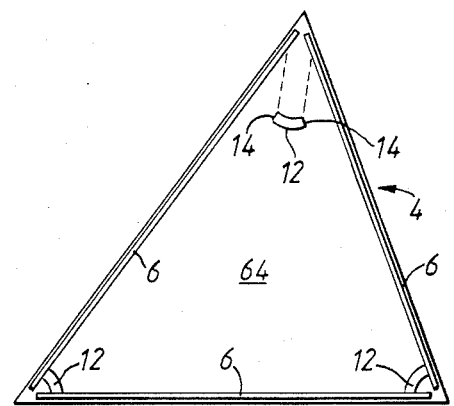
FIG. 4 shows how a structural unit is formed.

Referring now to FIGS. 2 and 3, there is shown a structural unit 4. The structural unit 4 comprises three elongate members 6. As shown in FIG. 2, one face 8 of each of the elongate members 6 is provided with a plurality of holes 10. The holes 10 are for receiving bolts (not shown) for bolting the structural units 4 together. Once the elongate members 6 are attached to a plastics covering 64, the elongate members 6 are rotated to the position shown in FIG. 3 to enable the elongate members 6 to be secured together as shown in FIG. 4.

The structural unit 4 shown in FIGS. 2 and 3 is shown somewhat schematically and it is shown without its locking devices. FIG. 4 shows a structural unit 4 and shows somewhat schematically for ease of illustration three locking devices 12. The locking devices 12 have tapered sides 14 and they operate with a wedging action as will be described in more detail hereinbelow.

Figure 5:
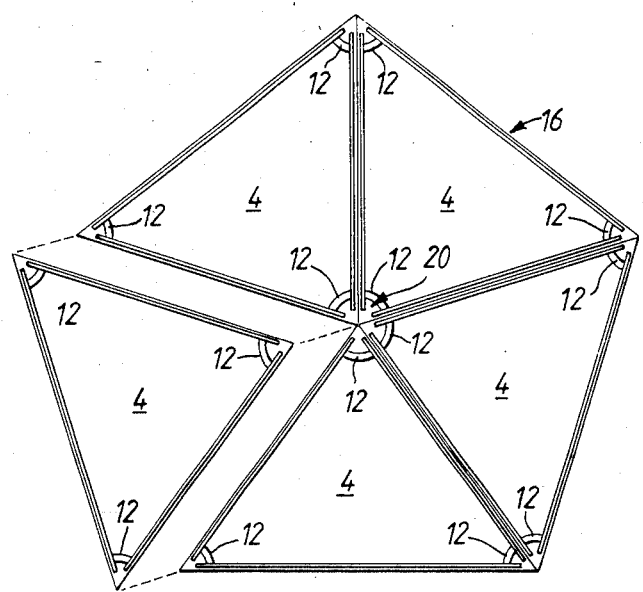
FIGS. 5 and 6 show two different structures that may be produced using differently shaped structural units.

Referring now to FIG. 5, there are shown five triangular structural units 4 connected together to form a five sided sub-structure 16 which can then be used to form part of a building, various sub-structures 16 being connected together.

Figure 6:
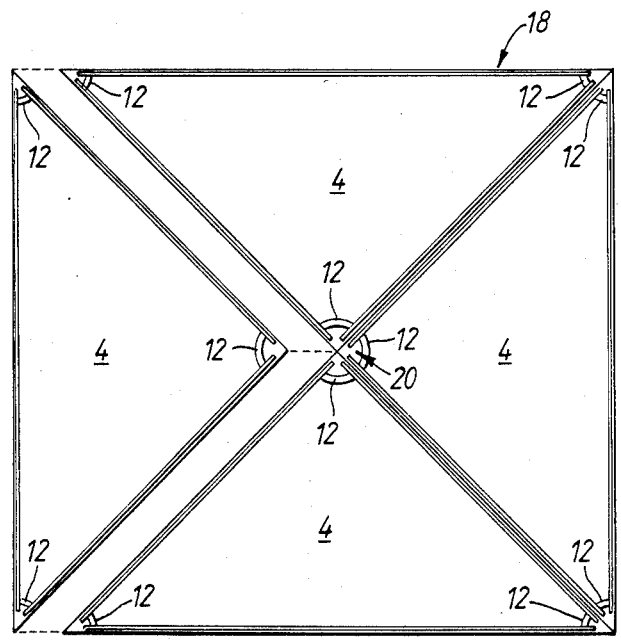

In FIG. 6, there are shown four structural units 4 which are connected together to form a four sided square sub-structure 18. A building can be formed by connecting an appropriate number of the sub-structures 18 together.

In FIGS. 1 to 6, the structural units 4 have been shown without a covering of a flexible material for ease of illustration. In fact, each of the structural units 4 is provided with a covering of a flexible material. The flexible material is secured to the elongate members 6 and it covers the area defined by the elongate members 6. The flexible material is cut precisely to shape and the structural units 4 are formed in a jig. The flexible material has to be cut precisely to shape because it effectively controls the expansion of the elongate members 6 as they are biased apart as the locking devices 12 are tightened into the corners of the structural units 4.

As shown in FIGS. 5 and 6, when the various structural units 4 are bolted or otherwise connected together, they define a central nodal aperture 20. The nodal aperture 20 is formed because the inner ends of the elongate members 6 do not touch each other as can be seen from FIGS. 5 and 6.

Figures 7, 8:
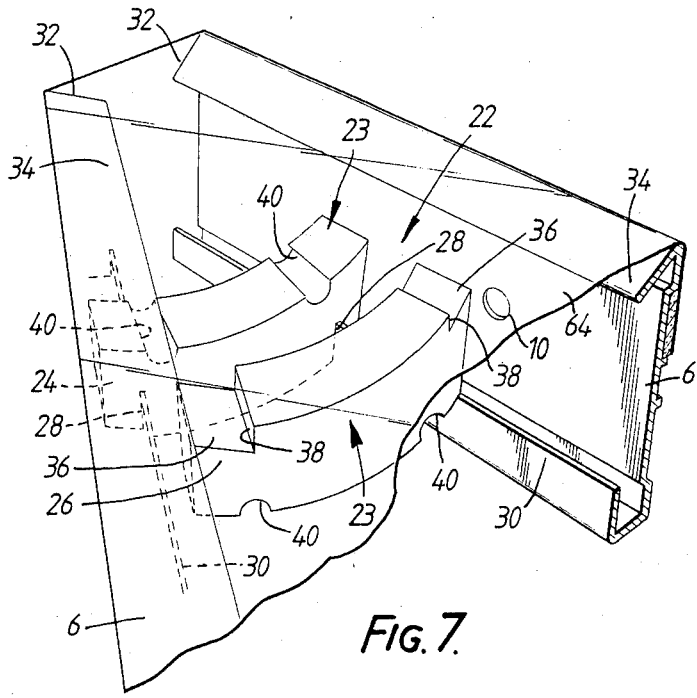
FIGS. 7 and 8 show the construction and operation of a locking device.

Referring now to FIGS. 7 and 8, there is shown a locking device 22 for connecting together a pair of elongate members 6. The locking device 22 comprises a wedge member 23 having a first half 24 and a second half 26. The first half 24 is provided with a pair of slits 28. The slits 28 receive an inwardly deformed upstanding lip 30 which forms part of the elongate member 6. The first half 24 thus holds the illustrated two elongate members 6 by the lips 30 and the first half 24 can slide along the lips 30 and so be drawn towards the converging ends 32 of the elongate member 6.

The elongate members 6 are also provided with inwardly projecting upper lips 34 and these lips 34 sit in recesses 36 formed at the two top corners of the second half 26 as shown. The recesses 36 each have a shoulder 38 against which the lips 34 abut. Because the wedge member 23 has the first and second halves 24,26, it will be apparent that the first half 24 can be located on the lips 30 and then the second half 26 can be located against the lips 34 and then seated on top of the first half 24 as shown in FIG. 8.

The wedge member 23 has a pair of apertures 40 for receiving a pair of bolts, one of which is shown as bolt 42 in FIG. 8. The bolt 42 has a hexagonal head 44 and a shank 46 which is threaded at its end 48. A washer 50 is provided on the shank 46. The threaded end 48 of the bolt 42 passes through its aperture 40 and then through an aperture 52 in a clamp member 54. As shown in FIG. 8, the clamp member 54 is S-shaped in cross section so that it has a second channel 5 and a second channel 58. The second channel 58 is slotted over the vertical part 32a of the end 32 of the right hand elongate member 6 as shown in FIG. 8. A nut 60 locates in the channel 56 so that the threaded end 48 of the bolt 42 can be screwed to the nut 60. The wall part 62 of the clamp member 54 locates approximately midway between the ends 32 when the locking device 22 is fully tightened.

It will be appreciated from FIG. 8 that another bolt 42 is located in the left hand aperture 40 shown in FIG. 8 and this bolt 42 engages with another clamp member 54 (not shown), which will have its channel 58 slotted over the vertical part (not shown) of the end 32 of the left hand elongate member 6. This said other clamp member 54 will be adjacent the illustrated clamp member 54 so that the wall part 62 of the said other clamp member 54 will be adjacent and abutting the wall part 62 of the illustrated clamp member 54. As the two bolts 42 are tightened, it will be apparent that the converging ends 32 of the elongate members 6 will move past the wedge member 23 to increase the surface area of the structural unit 4 and thereby to tighten a covering 64 of a transparent flexible material. The tightened covering 64 will be cut to shape so that it will control the expansion of the structural unit 4 as the locking device 22 is tightened. Thus, all of the structural units 4 can be produced to substantially the same desired size as is required for producing a building of a predetermined size.

Figure 9:
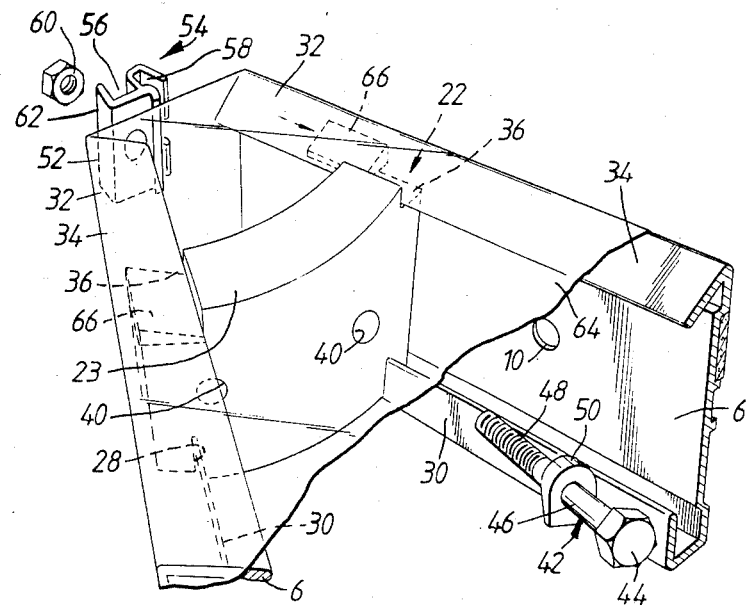
FIG. 9 shows the construction and operation of an alternative locking device.

FIG. 9 illustrates a locking device 22 which is similar to the locking device 22 shown in FIGS. 7 and 8 except that, in FIG. 9, the wedge member 23 is formed in one main piece instead of in the two halves 24,26. Also in FIG. 9, wedge pieces 66 are slid along underneath the lips 34 and on top of the recesses 36 when the wedge member 23 is in position, the wedge pieces 66 allowing the wedge member 23 to be made in one piece as illustrated and still easily be located in position.

The right hand end of the right hand elongate member 6 as shown in FIGS. 7,8 and 9 illustrates the outer profile of the elongate member 6. The covering 64 is drawn over this outer profile and is secured in position, for example by adhesive tape to be described in more detail hereinbelow. Other methods of securing the covering 64 to the elongate member 6 may be employed.

Figure 10:
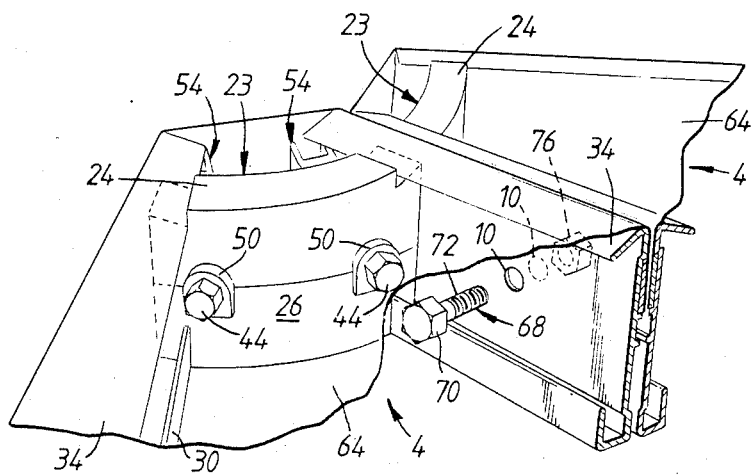
FIG. 10 illustrates in detail the connecting of a pair of structural units together.

Referring now to FIG. 10, there are shown the inner parts of two structural units 4 bolted together by means of a plurality of bolts, one of which is shown as bolt 68. The bolt 68 has a hexagonal head 70 and a shank 72 which passes through registering holes 10 in the elongate member 6. The shank 72 is threaded to receive a nut 76.

Figure 11:
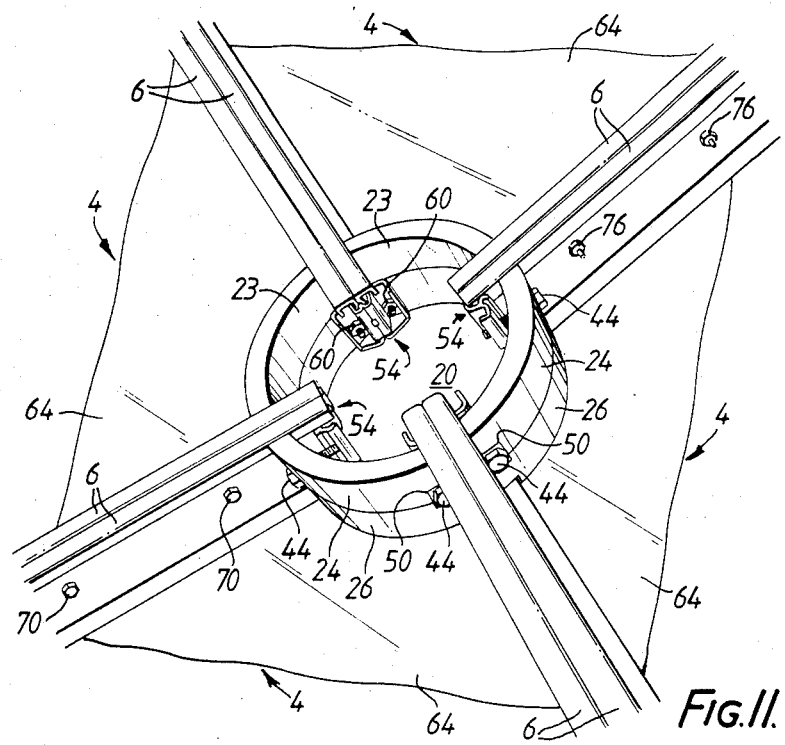
FIG. 11 shows a nodel aperture formed between four connected structural units.

Referring now to FIG. 11, there is illustrated the inner ends of four structural units 4 as bolted together. The clamp members 54 are clearly illustrated. It will be seen that the units 4 define a nodal aperture 20 because the ends of the elongate member 6 do not extend sufficiently inwardly to touch each other.

Figure 12:
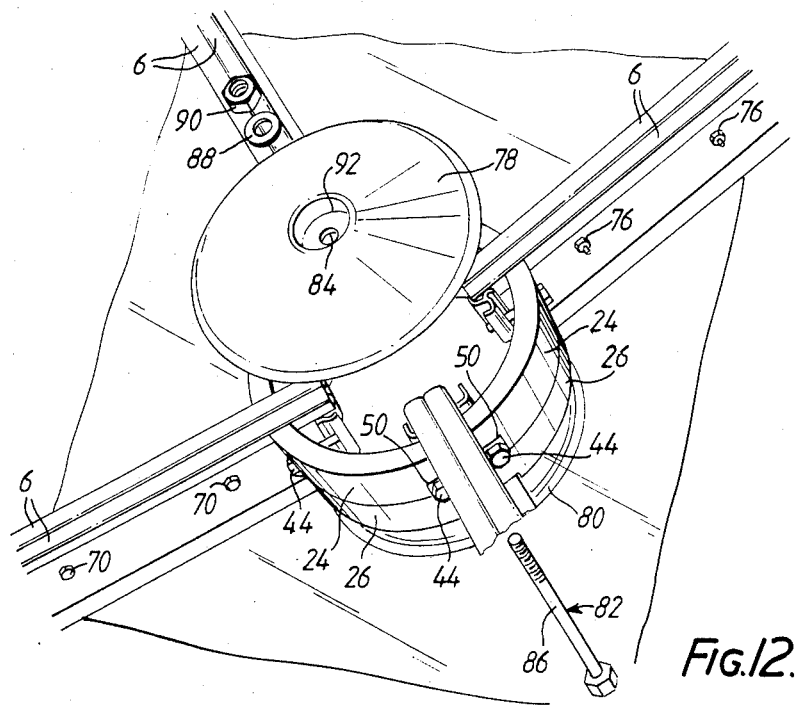
FIG. 12 shows a pair of caps for covering the nodel aperture shown in FIG. 11.

FIG. 12 shows a construction similar to that shown in FIG. 11 but with the nodal aperture 20 blanked off by an upper cap 78 and a lower cap 80. The caps 78,80 effectively close off entirely the sub-structure formed by the units 4, and the caps 78,80 are held in position by a long bolt 82 which passes through central holes in the caps 78,80, only the central hole 84 in the upper cap 78 being shown. The bolt 82 has a threaded shank 86 which receives a washer 88 and a nut 90, the washer 88 and the nut 90 locating in a counter-sunk bore 92 in the upper cap 78.

Referring back to FIGS. 2 and 10, some or all of the illustrated holes 10 will receive the bolts 68. If desired, some of the holes 10 may be used to secure in position strengthening/clamping members which are effective to clamp in position the covering 64.

Figure 13:
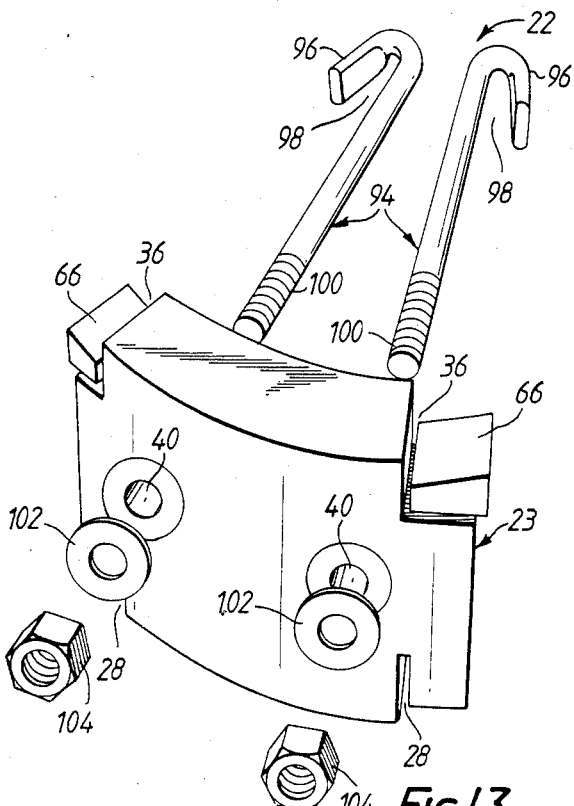

Referring now to FIG. 13, there is shown an alternative locking device 22 to that described above. The locking device 22 still employs a single piece wedge member 23 and the wedge pieces 66 as described above in connection with FIG. 9. However, the bolt 42 and the clamp member 54 are dispensed with and in their place is employed a single bolt 94 having a hooked end 96 which defines a recess 98 for receiving the end 32 of an elongate member 6. FIG. 13 shows two bolts 94 for passing through the illustrated two apertures 40. The bolts 94 have threaded shanks 100 for receiving washers 102 and nuts 104.

Figure 15:
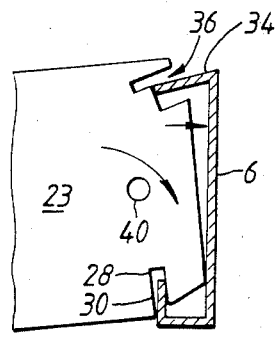
FIG. 13 and FIGS. 14 and 15 show two further alternative locking devices.
Figure 14:
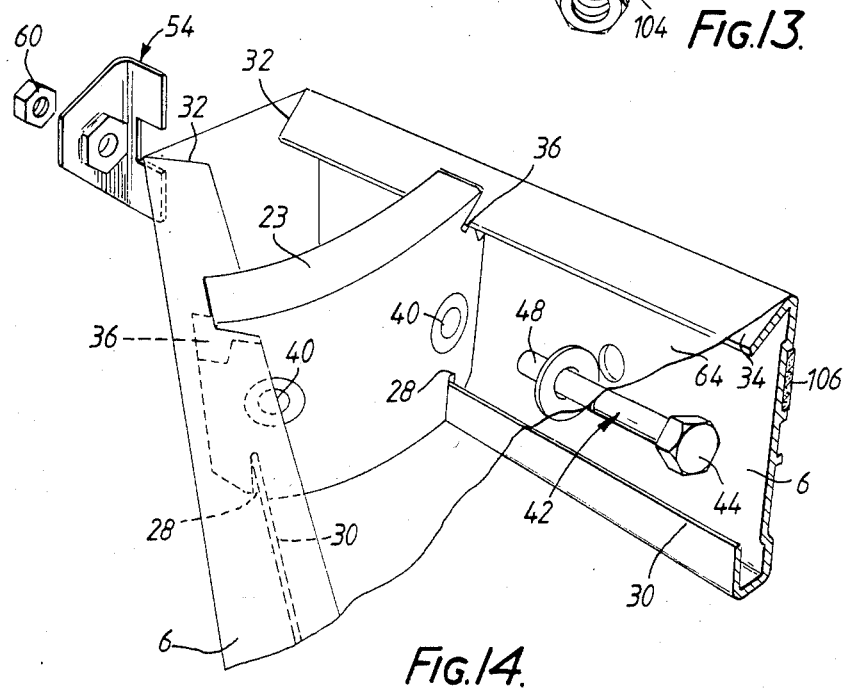

Referring now to FIGS. 14 and 15, there is shown a wedge member 23 which is manufactured to be in one piece. The wedge member 23 has the slits 28 for receiving the upstanding lips 30 as shown. The wedge member 23 is also provided with a pair of recesses 36 which are shaped as shown and which allow the elongate members 6 to fit in position as illustrated most clearly in FIG. 15. FIG. 14 also illustrates the use of the bolt 42 with a clamp member 54 which is a steel pressing and which is for engaging with one end of its elongate member 6.

Figure 16:
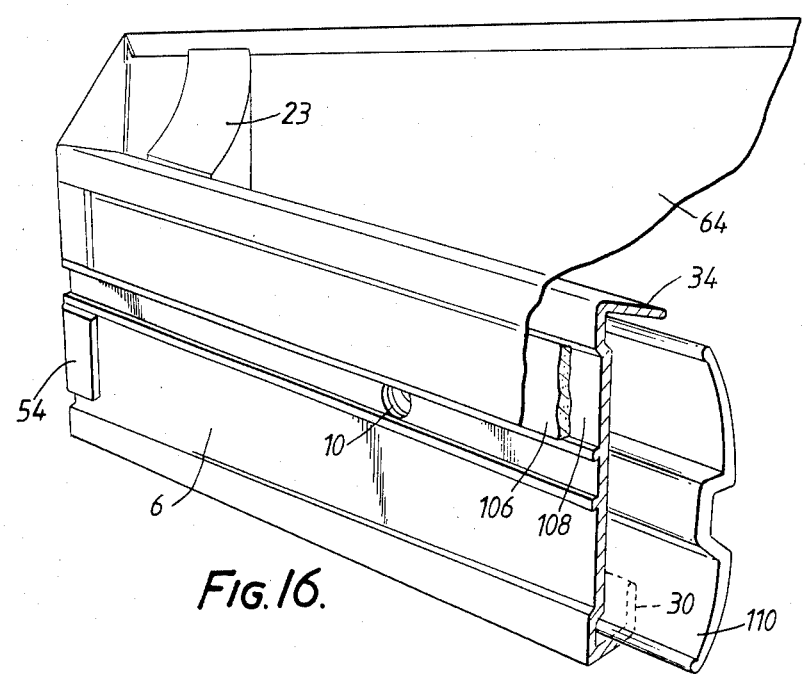
FIG. 16 shows the covering of an elongate member.

Referring now to FIG. 16, there is shown the outer profile of the left hand elongate member 6 shown in FIGS. 7,8 and 9. Double sided adhesive foam tape 106 is first located in a channel 108. The tape 106 is slightly thicker than the depth of the channel 108 so that the tape 106 extends out of the channel 108. The covering 64 is then stuck to the tape 106 and, when two structural units 4 are brought together, the covering 64 and the tape 106 become tightly clamped in position to securely hold the covering 64 and also to form a water-tight joint. If desired, an extra length of ordinary thin tape can be stuck over the covering 64 adjacent the tape 106.

FIG. 16 also illustrates the use of a strengthening member 110 which is shaped as shown and which locates, also as shown, using the lips 30,34 and more particularly, the channels formed by these lips 30,34. The strengthening member 110 is bolted in position and it acts to transfer forces from the bolts (see FIG. 10) to the outside edges of the elongate member 6.

Figure 17:
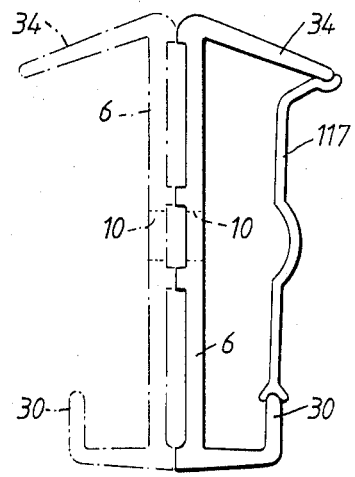
FIG. 17 illustrates a modification to FIG. 16.

Referring now to FIG. 17, there is shown the elongate member 6 but with the strengthening member 110 of FIG. 16 replaced with a cover 117 as shown. The cover 117 slips in place on the lips 30,34 as shown. The main function of the cover 117 is to cover the fixing bolts which join two elongate members together, the two elongate members then forming an I-beam. The cover 117 also provides a certain amount of additional strengthening of the elongate member 6 by forming a box section.

It is to be appreciated that the embodiments of the invention described above have been given by way of example only and that modifications may be effected.

Thus, for example the cross sectional shape of the elongate member 6 may be varied. Other types of locking device 22 may be employed. Although the illustrated covering 64 shown in the drawings is a transparent plastics material, any other desired type of covering may be employed. The structural units 4 may be of a shape other than triangular. Where the clamp members 54 are employed, each adjacent pair of clamp members 54 in a joint may be arranged to abut each other or may be arranged to be spaced apart, depending upon the precise type of angular joint formed.

The elongate members are preferably made of aluminum but other materials may be employed.

I claim:

1. A structural unit for forming a building, which structural unit comprises at least three elongate members which are connected to each other to define an area, a covering of a flexible material which is secured to the elongate members and which covers the area defined by the elongate members, and a locking device which connects at least two of the elongate members, the locking device comprising a wedge member and a tightening arrangement for tightening the wedge member in position, and the two elongate members being angularly oriented to define an angle with an apex therebetween, the tightening arrangement exerting a force on the wedge member directed towards the apex for moving the two connected elongate members apart to increase the surface area of the structural unit and thereby tighten the covering of the flexible material.

2. A structural unit according to claim 1 in which there are only three of the elongate members, the structural unit thus being in the form of a triangle.

3. A structural unit according to claim 1 in which the elongate members have upper and lower inwardly directed lips for engaging in and sliding along the wedge member.

4. A structural unit according to claim 3 in which the tightening arrangement comprises two bolts and two clamp members, each clamp member being for abutting one end of a pair of the elongate members, and the wedge member having a pair of apertures for receiving the pair of bolts.

5. A structural unit according to claim 3 in which the tightening arrangement comprises a pair of bolts each having a hooked end for abutting one end of a pair of elongate members.

6. A structural unit according to claim 3 in which the flexible material is a plastics material, and in which the covering is secured over an outer surface of the elongate members.

7. A structural unit according to claim 3 in which the elongate members are provided with a plurality of holes for enabling the structural units to be bolted together.

8. A structural unit according to claim 7 in which the elongate members are provided with strengthening members.

9. A building including a plurality of structural units:
each structural unit comprising at least three elongate members which are connected to each other to define an area, a covering of a flexible material which is secured to the elongate members and which covers the area defined by the elongate members, and a locking device which connects at least two of the elongate members, the locking device comprising a wedge member and a tightening arrangement for tightening the wedge member in position, and the two elongate members being angularly oriented to define an angle with an apex therebetween, the tightening arrangement exerting a force on the wedge member directed towards the apex for moving the two connected elongate members apart to increase the surface area of the structural unit and thereby tighten the covering of the flexible material;
the building comprising a plurality of nodes formed by joining the structural units together; and
the ends of the elongate members of the various structural units being such that they do not meet at the nodes.

* * * * *